US006959172B2

(12) United States Patent
Becker et al.

(10) Patent No.: US 6,959,172 B2
(45) Date of Patent: Oct. 25, 2005

(54) DOCKING STATION FOR ENABLING LANDLINE TELEPHONES TO SEND/RECEIVE CALLS VIA A DOCKED MOBILE TELEPHONE

(76) Inventors: Christopher Henry Becker, 23 Heston Street NW, Calgary, Alberta (CA) T2K 2C1; Leonard George Bleile, 20 Lenton Place SW, Calgary, Alberta (CA) T3E 5C8; Carl G. Lopp, 145 E. 48th St., Apt. 21A, New York, NY (US) 10017

( * ) Notice: Subject to any disclaimer, the term of this patent is extended or adjusted under 35 U.S.C. 154(b) by 0 days.

(21) Appl. No.: 11/027,659

(22) Filed: Dec. 30, 2004

(65) Prior Publication Data

US 2005/0143016 A1 Jun. 30, 2005

Related U.S. Application Data

(60) Provisional application No. 60/533,527, filed on Dec. 31, 2003, provisional application No. 60/623,189, filed on Oct. 30, 2004.

(51) Int. Cl.$^7$ ............................................. H04B 1/40
(52) U.S. Cl. ..................... 455/74; 455/74.1; 455/462; 455/465; 455/466; 455/426.1; 455/552.1; 455/553.1; 455/554.1; 455/414.1; 455/557; 455/558; 455/411; 455/417; 455/418; 379/211.02; 379/225; 379/45
(58) Field of Search ........................ 455/74, 74.1, 462, 455/426.1, 465, 552.1, 553.1, 554.1, 414.1, 455/554.2, 466, 461, 411, 417

(56) References Cited

U.S. PATENT DOCUMENTS

| 4,658,096 A | | 4/1987 | West, Jr. et al. ............... 379/59 |
|---|---|---|---|
| 4,737,975 A | | 4/1988 | Shafer ........................... 379/58 |
| 4,775,997 A | | 10/1988 | West, Jr. et al. ............... 379/58 |
| 4,922,517 A | | 5/1990 | West, Jr. et al. ............... 379/58 |
| 6,035,193 A | * | 3/2000 | Buhrmann et al. ........ 455/426.1 |
| 6,044,267 A | * | 3/2000 | Foladare et al. .......... 455/426.1 |
| 6,073,031 A | * | 6/2000 | Helstab et al. ............... 455/557 |
| 6,151,500 A | * | 11/2000 | Cardina et al. ........... 455/435.2 |
| 6,405,028 B1 | * | 6/2002 | DePaola et al. ............. 455/406 |
| 6,600,734 B1 | * | 7/2003 | Gernert et al. ............... 370/352 |
| 6,735,432 B1 | * | 5/2004 | Jarett et al. .................. 455/417 |
| 6,766,175 B2 | * | 7/2004 | Uchiyama .................... 455/462 |
| 6,778,824 B2 | * | 8/2004 | Wonak et al. ............ 455/426.2 |
| 6,785,517 B2 | * | 8/2004 | Schornack et al. ......... 455/74.1 |

* cited by examiner

FOREIGN PATENT DOCUMENTS

CA 2316076 2/2002

Primary Examiner—Marceau Milord
(74) Attorney, Agent, or Firm—Lowenstein Sandler, PC

(57) ABSTRACT

A docking station, which connects a cellular telephone with one or more landline telephones, includes a connection switch configured to detect a condition of at least one landline of a premises and to establish a connection with a landline based on a detected condition, an interface configured to connect with any of a plurality of types of cellular telephones, and a processor configured to control a plurality of functions of the docking station and to communicate with each of the plurality of types of cellular telephones. An electrical characteristic of a cable or a wireless module connected to the cellular-telephone interface is used by the processor to identify a type of a cellular telephone connected to the docking station. The processor is programmed to enable a landline telephone connected to the docking station to send or to receive calls via the cellular telephone connected to the docking station, based on an identified type of the cellular telephone connected to the docking station.

38 Claims, 13 Drawing Sheets

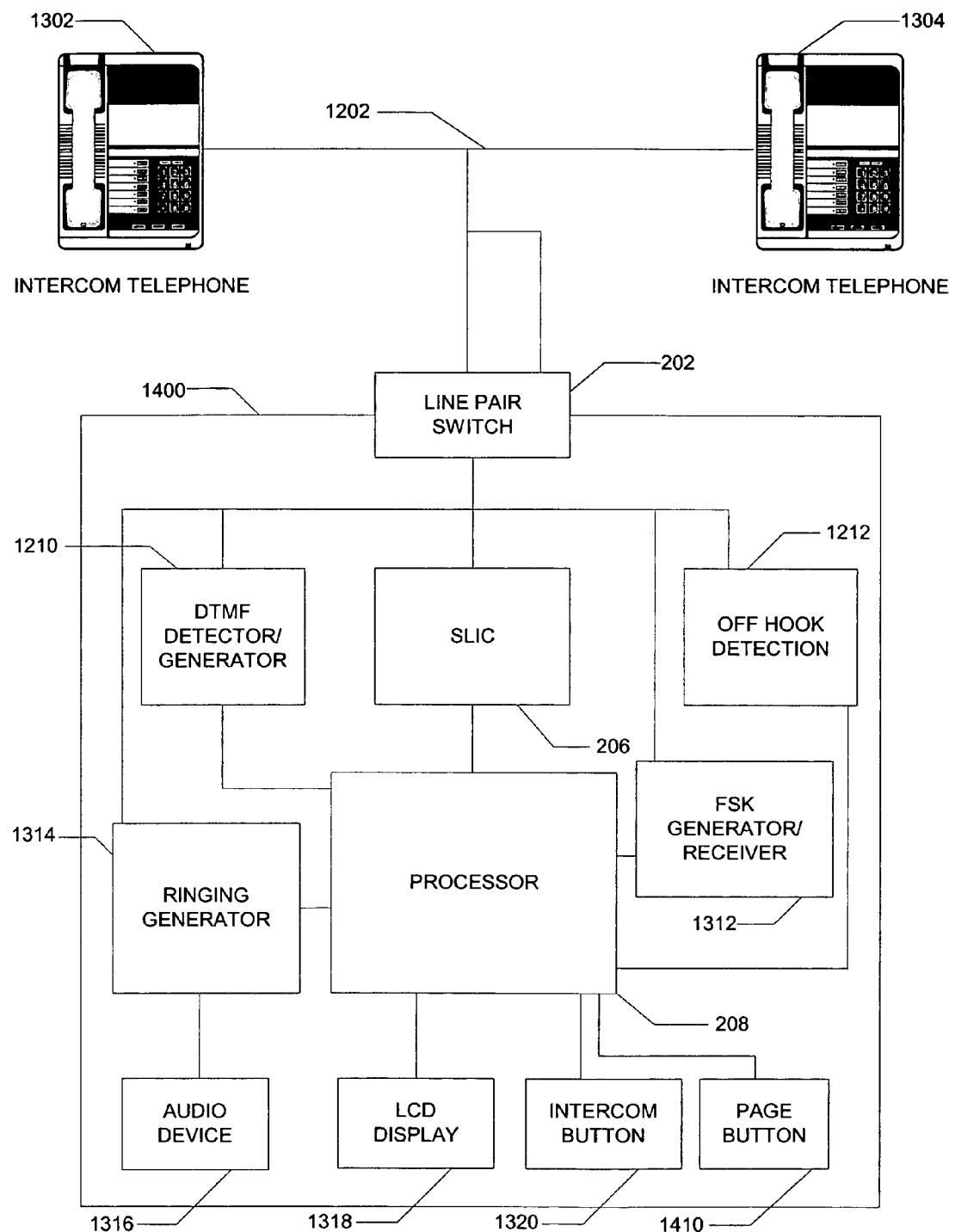

and also U.S. Provisional Application No. 60/623,189 filed Oct. 30, 2004.

DOCKING STATION FOR ENABLING LANDLINE TELEPHONES TO SEND/RECEIVE CALLS VIA A DOCKED MOBILE TELEPHONE

CROSS REFERENCE TO RELATED APPLICATIONS

The present application claims benefit of U.S. Provisional Application No. 60/533,527 filed Dec. 31, 2003, and U.S. Provisional Application No. 60/623,189 filed Oct. 30, 2004. The entire disclosures of each of these provisional applications are incorporated herein by reference.

BACKGROUND OF THE INVENTION

1. Field of the Invention

The present invention relates generally to a docking station for a mobile telephone, and more specifically to a docking station that provides an interface to enable landline telephones to send and receive calls via a mobile telephone docked in the docking station, and to enable the landline telephones to utilize facilities and features provided by the mobile telephone via the docking station.

2. Related Art

In recent years, there has been an increasing desire among many in the general public to "keep in touch" or be available to others using telephony devices such as a home telephone, a mobile (wireless) telephone (also known as a cellular telephone or a cell phone), an office telephone, an office fax, etc. Each of these telephonic devices has a unique identification on the public telephone network: an individual telephone number. Thus, an individual must give out several telephone numbers in order to be reachable by others through various different telephonic devices.

The popularity of mobile telephones has led a growing number of mobile telephone users to abandon traditional landline telephones as their main home telephones in favor of using their mobile telephones as their main home telephones. Mobile telephones as home telephones provide the advantage of having only one telephone number for travel or home. Mobile telephones as home telephones, however, have several disadvantages in the current art. Generally, a mobile telephone cannot have extension telephones, which have the same telephone number as the mobile telephone and which are able to participate on the same telephone call. Further, many features that are available to a wired or landline telephone system are not available to a mobile telephone.

Additionally, it is often desirable to be able to communicate from one room to another in a premises. For example, communication is difficult between different levels in a house or among offices in a small office building. In such situations it is necessary to buy and install special intercom systems, a PBX (private branch exchange), or a key telephone system. However, none of these solutions is cost-effective or easily moved from one location to another.

SUMMARY OF INVENTION

The present invention relates generally to a docking station for a mobile telephone, in which the docking station provides an interface to enable landline telephones to send and receive calls via a mobile telephone docked in the docking station, and to enable the landline telephones to utilize facilities and features provided by the mobile telephone via the docking station. According to the invention, the docking station connects with the mobile telephone via the mobile telephone's multi-pin connector. The docking station determines the make and the model of the mobile telephone, i.e., the type of the mobile telephone, based on the multi-pin connector. Once the type is determined, the docking station utilizes its internal software/firmware to control the functions of the mobile telephone, by sending appropriate signals to the mobile telephone through the pins of the multi-pin connector.

According to an aspect of the present invention, the docking station determines which pins of the multi-pin connector correspond to power pins of the docked mobile telephone, and also determines an interface protocol for the docked mobile telephone. The docking station provides charging power to the mobile telephone as a regular charge, a trickle charge, or another type of charge, as required by the docked mobile telephone, in order to power the mobile telephone and to charge the internal battery of the mobile telephone, simultaneously.

According to another aspect of the invention, the mobile telephone may wirelessly "connect" to the docking station using a wireless protocol, such as Bluetooth®, Zigbee™ and wi-fi, for example. Signals such as voice signals and data signals are encoded/decoded into the wireless protocol by the docking station. In this manner, the mobile telephone does not have to be physically connected to the docking station while it provides its features to the landline telephones connected to the docking station.

According to yet another aspect of the present invention, the docking station controls the functionality of the mobile telephone via the connection pins to perform most or all of the functions of the mobile telephone responsive to telephone signals of telephones connected to the landline system. The docking station further includes circuitry to provide dial tone and dual-tone multi-frequency (DTMF) detection, to provide battery power, etc., to any analog telephone on the landline connected to the docking station. In this manner, any analog telephone connected to the landline may use the mobile telephone to make telephone calls via the mobile telephone. Further, any analog telephone connected to the landline wiring may be used to receive telephone calls via the mobile telephone. Advantageously, an echo canceller is incorporated in the docking station and is connected between the docking station and the analog telephone(s) in order to compensate for (cancel) an impedance imbalance, which can cause undesirable noise in the signal path.

According to a further aspect of the present invention, the docking station includes circuitry to receive data from the mobile telephone and circuitry to provide data-encoded signals to an analog line. For example, when the mobile telephone receives a Caller ID, the docking station converts a digital signal corresponding to the Caller ID into an analog frequency-shift-key (FSK) signal. This allows most currently available Caller-ID-enabled telephones and Caller ID boxes to receive and display a Caller ID. Other data-encoded signals received by the mobile telephone, such as short message service (SMS) signals and message waiting signals, for example, also may be similarly displayed.

According to yet another aspect of the present invention, the docking station determines which pair of two pairs of telephone wires are available to the docking station. When the docking station is plugged in to a telephone landline connector, the docking station tests a first pair of wires for an operative voltage from a central office. The docking station also tests a second pair of wires for an operative voltage. Then docking station selects a pair of wires that does not have a voltage present. Advantageously, the docking station provides an indication as to which pair of wires it is connected to and/or which pair or pairs of wires have a central-office voltage present.

Optionally, the testing of the pairs of telephone wires may be done manually via a selection switch on the docking station, which allows a user to manually select which of the pairs of wires to be tested. An indicator on the docking station indicates whether voltage is present on the pair of wires being tested.

According to still another aspect of the present invention, the docking station provides a voice and data intercom system between and among telephones connected to the landline of the premises. Any telephone on the landline may send a DTMF signal or string of signals to the docking station, which alerts the docking station that an intercom call is desired. The intercom number of the desired telephone (called telephone) is entered. A DTMF detector on the called telephone listens for its own intercom number, and rings if it detects its own intercom number. Advantageously, data messages, light signals, differential ringing tones, etc. may be delivered to a specific telephone.

According to a further aspect of the present invention, the docking station's software/firmware is updatable by connecting the docking station to a personal computer (PC). The PC is connected to a data network (e.g., the Internet) and downloads updates. The downloaded updates are formatted and loaded into the docking station by the PC. In this manner, new types of mobile telephones and other devices may be detected and controlled by the docking station without having to replace the docking station.

According to a still further aspect of the present invention, when the mobile telephone docked in the docking station is a "walkie-talkie"-type mobile telephone, also known as a "push-to-talk" or PTT-enabled mobile telephone, landline telephones connected to the docking station are able to function as "walkie-talkie"-type telephones. The docking station's software/firmware interprets signals from a predefined button or a hook switch on the landline telephone to correspond to the stop/start of speech. That is, signals from pressing and releasing the predefined button or from toggling the hook switch are interpreted to correspond to signals from a PTT button of a PTT-enabled mobile telephone. However, the predefined button or the hook switch need not be held down while a user is speaking.

BRIEF DESCRIPTION OF THE DRAWINGS

The present invention will be more readily understood from the detailed description of the preferred embodiment(s) presented below considered in conjunction with the attached drawings, of which:

FIG. 14 is a block diagram of a paging/intercom station, according to an embodiment of the present invention.

DETAILED DESCRIPTION OF THE PREFERRED EMBODIMENTS

Figure 1:
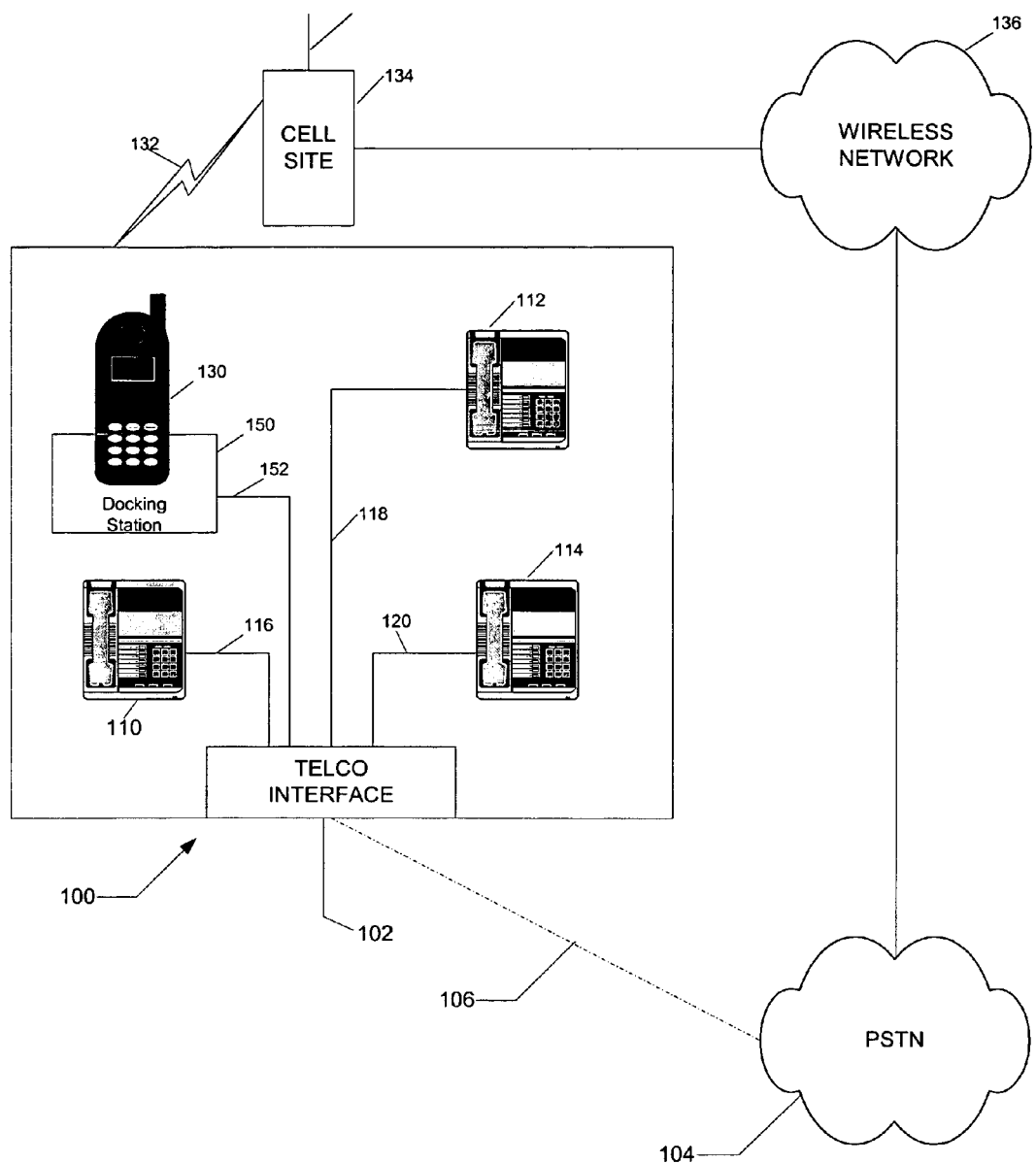
FIG. 1 is a block diagram of a premises in which a docking station controls landline (wired) telephones, in accordance with an embodiment of the present invention.

Turning now to FIG. 1, a block diagram of a wire-line premises is shown, generally at 100. The premises 100 includes a telephone company interface (herein "telco interface") 102. According to the prior art, the telco interface 102 connects the premises 100 to a public switched telephone network (PSTN) 104 via a four-wire telephone line 106. The telco interface 102 connects one or more analog telephone instruments, represented by telephones 110, 112, and 114 to each other and to the telephone line 106 via four-wire lines 116, 118, and 120, respectively. As is known in the art, each telephone 110, 112, and 114 receives power from the PSTN 104 in order to provide basic telephonic service. Additionally, any of telephones 110, 112, and 114 may have a supplementary power supply to implement features such as Caller ID, message-waiting lights, etc. Furthermore, each of telephone 110, 112 and 114 is dual-line capable, as is known in the art.

Further, a wireless telephone 130 is in communication 132 with a cell site 134. The cell site 134 is part of a wireless network 136. The wireless network 136 provides communication and other functionality to a wireless telephone 130, as is known in the art. The wireless network 136 is connected to, or is a part of, the PSTN 104, also as is known in the art.

A wireless telephone docking station 150 in accordance with an exemplary embodiment of this invention also is connected to the telco interface 102 via a four-wire line 152. The docking station 150 also connects to the wireless telephone 130 via a connector (not shown, but well known in the art) appropriate for the manufacturer or type of the wireless telephone 130. In this manner, the docking station 150 is connected to all of the telephone lines 116, 118, and 120 as well as the wireless telephone 130 via the telco interface 120.

According to this exemplary embodiment of the present invention, the docking station 150 senses the presence of the wireless telephone 130. The docking station 150 then determines whether there is a pair of wires available to which it may connect. The docking station 150 measures a voltage on a first pair of wires. If a line voltage (e.g., 48 V) is present, then the first pair of wires is connected to the PSTN 104. A second pair of wires then is tested. If there is no line voltage, the docking station 150 supplies a line voltage to activate the second pair of wires to each of telephone 110, 112, and 114.

Optionally, testing of the pairs of telephone wires may be done manually via a selection switch (not shown) on the docking station 150, which allows a user to manually select which of the pairs of wires to be tested. An indicator (not shown) on the docking station 150 indicates whether voltage is present on the pair of wires being tested. For example, the indicator may be an LED device with red and green LEDs, such that, when the red LED lights up it indicates that there is voltage present; and when the green LED lights up it indicates that no voltage is present. Similarly, the indicator may be an audible device such that a first type of audible sound is heard when there is voltage present, and either silence or second type of audible sound is heard when no voltage is present.

Once the docking station 150 is connected to the telephones 110, 112, and 114, then any of the telephones 110, 112, or 114 may use the wireless telephone 130 as if it was a landline telephone. The telephones 110, 112, and 114 may make outgoing telephone calls, receive incoming calls, receive Caller IDs, receive short-message-service (SMS) messages, etc. Such functionality is provided by the docking station 150 in conjunction with the wireless telephone 130.

Figure 2:
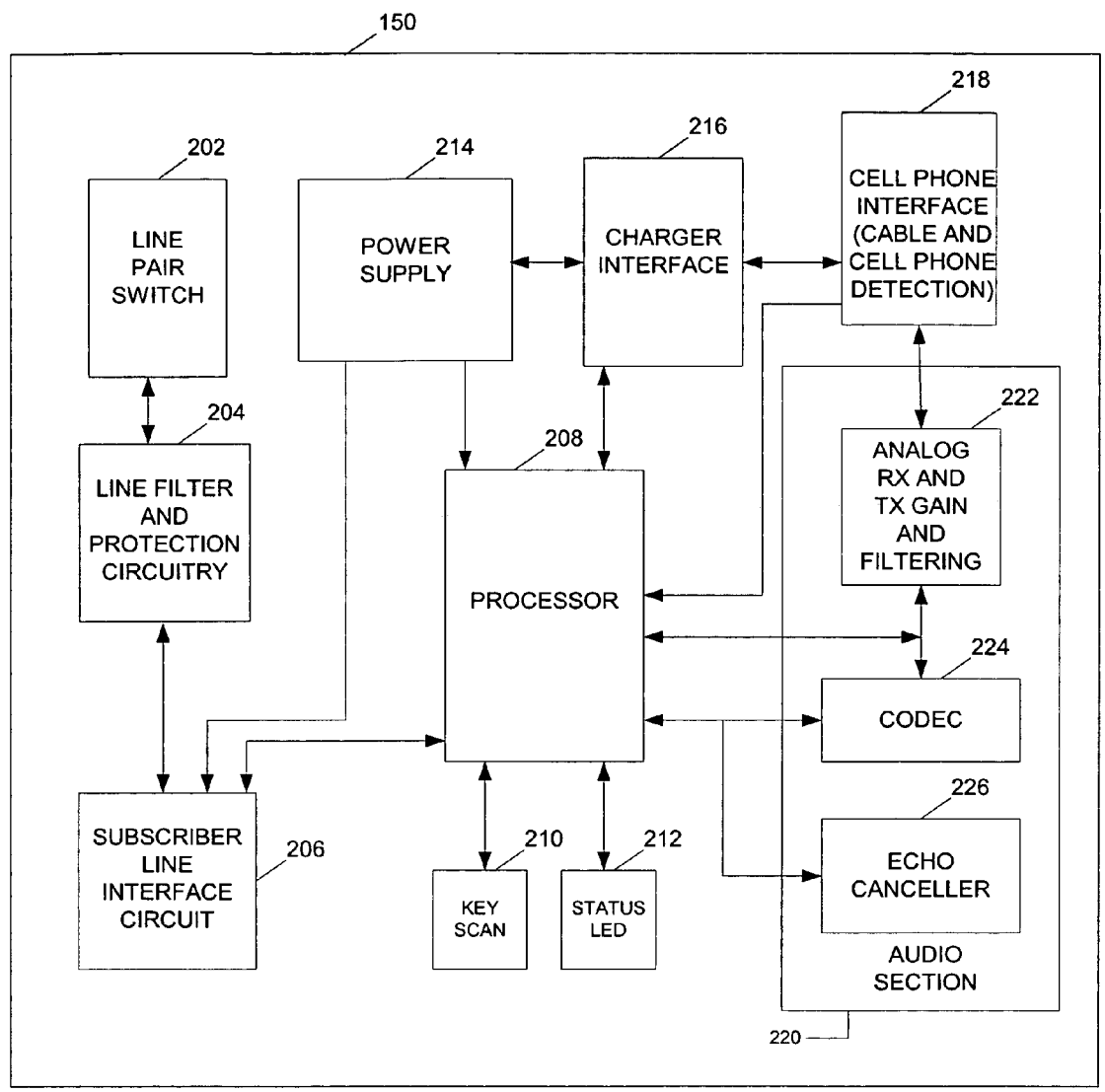
FIG. 2 is a block diagram of the docking station of FIG. 1.

Turning now to FIG. 2, a block diagram of the docking station 150 is shown. A line-pair switch 202 is shown in this exemplary embodiment. The line-pair switch 202 is a mechanical double-pole, double-throw (DPDT) side-actuated slide switch. The line-pair switch 202 allows a user to manually select connection of the docking station 150 to either Line 1 or Line 2 (an inner or an outer pair of conductors on a telephony jack). Alternatively, the line-pair switch 202 may be an automatic switch that senses a voltage on the telephone lines and connects to a pair of wires with no voltage.

The line-pair switch 202 is connected to line-filtering circuitry 204 comprised of two pi-filters that attenuate unwanted out-of-band signals. A fuse in the line-filtering circuitry 204 protects the docking station 150 from high-current differential surges. The line-filtering circuitry 204 also is comprised of, in this exemplary embodiment, a diode-bridge crowbar-sideactor clamp to protect a subscriber-line interface circuit 206.

The subscriber-line interface circuit (SLIC) 206 is comprised of, in this exemplary embodiment, a Si3210 IC, available from Silicon Labs. The SLIC 206 is described in detail in a Si3210KT datasheet, which is incorporated by reference herein in its entirety. In general, the SLIC 206 performs the following functions:
tip/ring battery voltage,
ring generation,
FSK and CAS detection,
signal generation,
DTMF detection,
analog and digital audio programmable gain,
envelop detection,
varilosers, and
Watchdog functionality.

Relatively few discrete components are required for the Si3210 DC-DC converter to generate a negative DC battery voltage level (+/−48 VDC) required to operate analog telephone functions.

The docking station 150 also includes a processor 208. In this exemplary embodiment, the processor 208 is comprised of a 16 bit microcontroller with 128 K bytes of ROM and 10 K bytes of RAM. A main clock source is a 9.216 MHz, 3.3V, 100 PPM crystal. The processor 208 is responsible for controlling all timing and functionality of the docking station 150.

A key scan circuit 210 and a keyboard (not shown, but well known in the art) consisting of two rows and one column is connected to the processor 208. The keyboard is checked every 16 ms to determine whether a key has been pressed. If a key matrix closure is detected by the key scan 210, a key scan algorithm is executed to determine the exact key pressed. A key must be pressed for two consecutive scans (32 ms) in order to be valid.

A status LED 212 also is connected to the processor 208. The status LED 212 is a low-cost dual-color (e.g., green/red), T-1¾, three-leaded diffused LED. The status LED 212 is responsible for indicating one of three states of the docking station 150 to a user:

Solid GREEN Indicator: the docking station 150 is connected to the wireless telephone 130 (via a cable or wireless protocol);

Flashing GREEN Indicator: the docking station 150 is powered on but is not connected to the wireless telephone 130; and Solid RED Indicator: indicates that:
1. The docking station 150 is plugged into a telephone line that is already in use by a landline service. This is an error indicator and the user should disconnect the landline service before plugging in the docking station 150; and/or
2. Power to the docking station 150 is insufficient.

A power supply 214 provides AC-DC power from a transformer that converts 120 VAC to 9 VDC RMS, depending on a load drawn by the docking station 150. Noise at an input rail for 9 VDC is reduced by filtering capacitors. A zener diode clamp is used to protect a regulator. The 9 VDC input rail feeds three separate supplies: VDC, Regulated +3.3 VDC, and Charge. The VDC is the reference voltage rail required for a Si3210 SLIC DC-DC converter to generate +/−48 VDC line voltage. The Regulated +3.3 VDC is a regulated supply source for almost all integrated circuits (ICs) in the docking station 150.

The power supply 214 also is connected to a charger interface 216. The 9 VDC input is dropped across a high-current diode and supplies charging circuitry in the charger interface 216. This section supplies power for the charging circuitry and current required for trickle charging a connected wireless-telephone battery. Transistors, a high-current amplifier, a current control 3 W resistor, noise reduction capacitors, and voltage-level setting components all work to form an output of a trickle charger. The charger interface 216 also is connected to a processor output to turn the charging circuitry off. If a CHG_OFF output is high, the charger interface 216 is disabled. The high-current amplifier is used to provide charger voltage feedback via a processor A/D input.

A cell phone interface 218 is connected to the charger interface 216. The cell phone interface 218 is comprised of a detection circuits for detecting a PCMCIA connector, a cable, and a cell phone (wireless telephone). The charging circuitry charges a battery of the wireless telephone 130 at a voltage and a current appropriate for the type of the wireless telephone 130 connected to the docking station 150. Optionally, the charging circuitry provides a charge to the wireless telephone 130 in an amount ranging from a full charge to a medium charge to a trickle charge. Optionally, the docking station 150 includes an visual indicator for showing a charging status of the battery of the wireless telephone 130.

The PCMCIA connector is a 15-pin male, surface-mount PCB connector with a locking key. It is the primary interface for the docking station 150 and a cell phone cable assembly or a wireless module. For example, the PCMCIA connector is configured to connect with any of a plurality of wireless modules such as, for example, Bluetooth® dongle, a wi-fi module, and a Zigbee™ module. Signals assigned to each pin on the PCMCIA connector are unique to the docking station 150 but are universal for an entire family of cellphone station products.

Optionally, the docking station 150 includes one or more internal circuits for providing wireless connectivity to a mobile telephone via, for example, Bluetooth®, Wi-fi, and/or Zigbee™ standards.

A detection circuit for detecting a cable or an accessory consists of capacitors, resistors, and a buffering amplifier. A resistor forms half of a divider once the cable assembly (or the wireless module) is plugged into the docking station 150. Depending on the resistor in the cable assembly, an output of the divider is routed to the processor 208 to determine which type of cable is connected and thus to determine which type (e.g., manufacturer and model) of cellular telephone is connected.

A wireless-telephone detection circuit includes a comparator circuit. An LMV331 DBV Comparator IC is used to compare a received serial-data input (RX) to a DC voltage level set by discrete components. If there is no wireless telephone connected, the RX will be low and the output of the comparator will also be low (<0.5 VDC). If there is a wireless telephone connected, the RX will be at a level greater than 1.03V and thus the output of the comparator will be high (>2.4 Vdc). The output of the comparator then is routed to the processor 208. When no cable or cell phone is connected, a pull-down resistor at an input of the comparator ensures that the comparator is not falsely triggered by transient noise.

An audio section 220 is connected to both the cell phone interface 218 and the processor 208. The audio section 220 is comprised of an analog RX and TX (reception and transmission) gain and filtering circuitry unit 222, a codec 224, and an echo canceller 226.

The analog RX and TX gain and filtering circuitry unit 222 comprises single-ended and differential rail-rail amplifiers, capacitors, and resistors used for buffering and adjusting analog gains between a wireless-telephone output and an input of the codec 224. The analog RX and TX gain and filtering circuitry unit 222 also filters unwanted out-of-band signals.

According to this exemplary embodiment of the present invention, the codec 224 is a Motorola MC145483. The MC145483 is a 3 V, 13 Bit, Linear PCM codec. A Frame Sync (Bit_FS) is set at 8 KHz and a codec clock is set at 256 KHz. As is known in the art, the codec 224 performs the following functions: digitizing and reconstructing human voice, and high- and low-Pass filtering.

The echo canceller 226 comprises, in this exemplary embodiment, a Zarlink MT93L16AQ Echo Canceller IC. The echo canceller 226 contains both an acoustic and a line echo canceller. It is designed to be powered by a single 2.7–3.3 V DC supply but has 5 V tolerant inputs. The MT96L16AQ performs the following functions:
digital audio gain control,
track changing echo environment with fast convergence times,
0 dB acoustic echo return loss (ERL) and 0 dB line echo return loss,
adaptation algorithm to allow for convergence even during double talk,
full duplex speech with no switched loss on audio paths,
auto gain control (AGC) on speech paths,
offset nulling of all 2 PCM channels,
howling prevention, and
mute options on speech paths.

Figure 3:
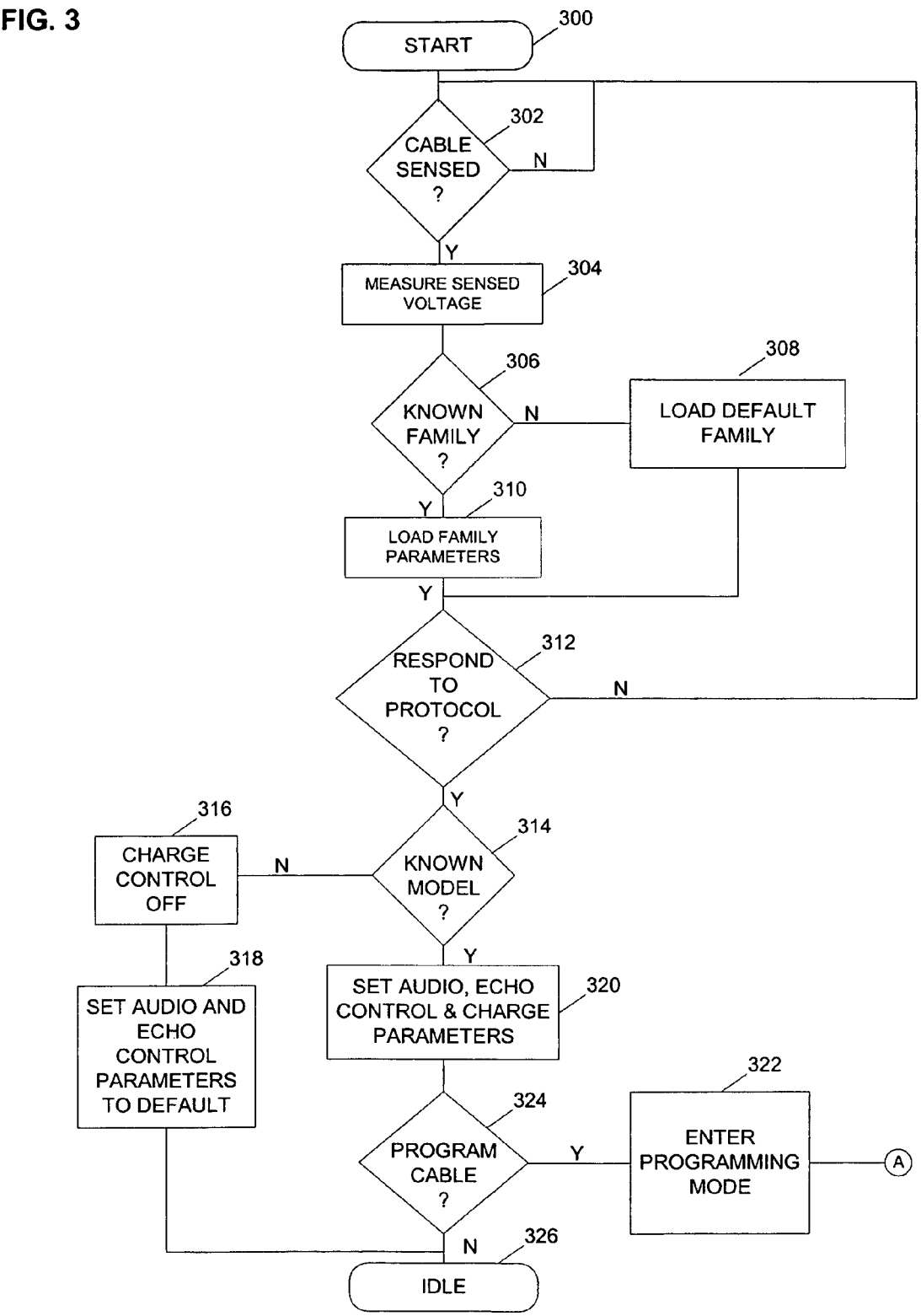
FIG. 3 is a flow chart of an operation for detecting a mobile telephone docked to a docking station, according to an embodiment of the present invention.
Figure 4:
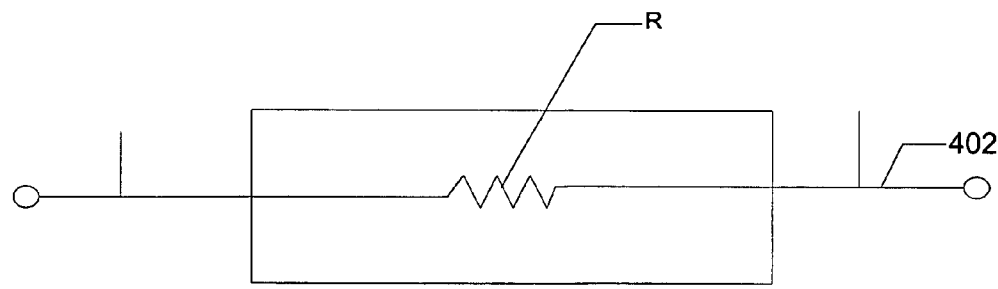
FIG. 4 schematically shows a programming cable, according to an embodiment of the present invention.

Turning now to FIG. 3, processing when a connection is made at cell phone and cable interface 218 according to an exemplary embodiment of this invention is shown. Processing starts at step 300 and proceeds to step 302, where a determination is made as to whether a cable is sensed. In this exemplary embodiment, when a wireless telephone or a programming cable (such as the programming cable 402 of FIG. 4) is plugged into the cell phone and cable interface 218 of the docking station 150, a cable connection is sensed by detecting a wire of the cable. The wire has a resistance (R) which may be 0 ohms or greater. The wire is connected to an A/D converter (not shown, but well known in the art) at the cell phone and cable interface 218. If no cable is detected at step 302, then processing loops back to step 300.

Figure 5:
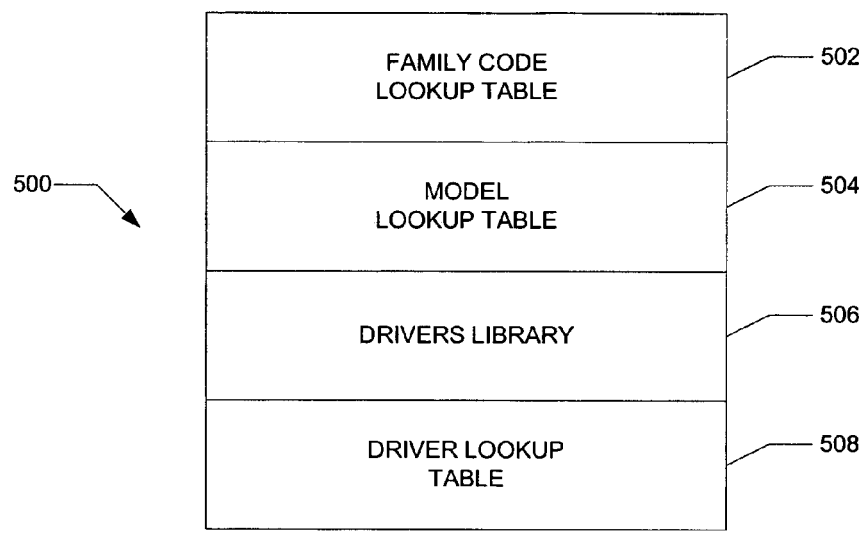
FIG. 5 schematically shows a memory of a processor of a docking station, according to an embodiment of the present invention.

If a cable is detected at step 302 then processing proceeds to step 304. At step 304, the processor 208 compares an A/D reading to a look-up table stored in a program memory. An exemplary memory layout 500, including a look-up table 502, is illustrated in FIG. 5.

Processing continues to step 306, where a wireless telephone "family" grouping for the cable is determined. In accordance with the exemplary embodiment of the present invention, a "family" may be a manufacturer's grouping (e.g., Motorola v-series), a specific phone (e.g., Kyocera Smartphone) or a manufacturer (e.g., Nokia). The A/D reading also may be used to differentiate between types of devices (i.e., Bluetooth® module, accessory, programming cable, cell phone, etc.).

If, at step 306, a family type cannot be determined, a default is loaded at step 308. If a family is determined, then processing proceeds to step 310, where protocol parameters for the family are loaded. Processing from both step 308 and step 310 moves to step 312.

At step 312, a determination is made as to whether the connected device responds to a family protocol. Using the family's type as an index, the docking station 150 tests all protocols associated with that family and waits for a response from the connected device. That is, the docking station 150 attempts to communicate via an AT type command set or any number of proprietary protocols (i.e., one-wire systems, UARTs with specially encoded data words, etc.). This test requires hardware with sufficient flexibility to accommodate this under software control.

If no satisfactory response is obtained, then processing loops back to the start at step 300. If, at step 312, a satisfactory response is obtained, processing moves to step 314. At step 314, a determination is made as to whether the connected device is a known model. The processor 208 compares a type of communication protocol to a model lookup table 504 (FIG. 5) for identification.

If, at step 314, an exact model is not identified, the charger interface 216 is disabled at step 316 and default audio, echo canceling, and command control parameters are set at step

318. If the exact model is identified at step 314, then, at step 320, the hardware is configured as shown in the model lookup table 504.

As described above, the echo canceller 226 is included in the audio section 220 in accordance with the exemplary embodiment of the present invention. Some telephone devices present audio with side tone removed, and some do not. Likewise, some telephone devices have echo cancellers on board and pass audio through to their accessory interface with echo canceling enabled, and some do not. The echo canceller 226 allows the docking station 150 to be able to adapt to different environments "on the fly" or as necessary.

The charger interface 216 also is set up when a wireless telephone is detected. Each wireless telephone generally has a unique charging signature. The charger interface 216 and the processor 208 alter voltage, current, and on/off cycle times depending on the wireless telephone's requirements. The audio section 220 also is customized based on the model of the connected wireless telephone. The TX/RX side tone paths are adjusted (at 222) based on known parameters of the connected wireless telephone.

If, at step 324, the processor 208 determines that a programming cable is connected to the cell phone and cable interface 218, the docking station 150 assumes a programming mode at step 322. In accordance with this embodiment of the present invention, a UART is used for programming (not shown, but well known in the art). Processing moves through connector A to FIG. 6. If a programming cable is not detected at step 324, then processing ends at step 326.

Figure 6:
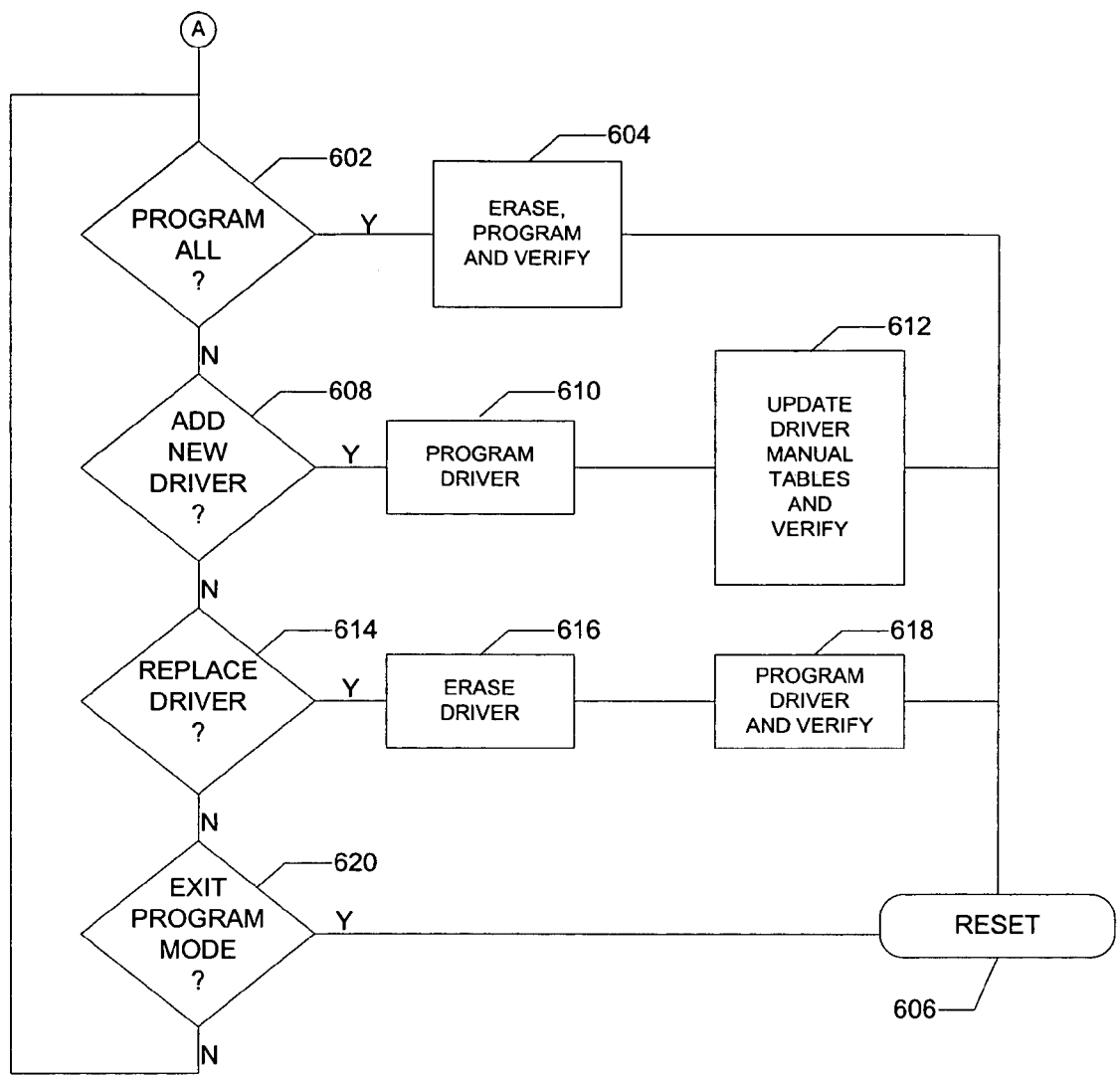
FIG. 6 is a flow chart of an updating operation of a processor of a docking station, according to an embodiment of the present invention.

Turning now to FIG. 6, a flowchart of a programming operation of the processor 208 of the docking station 150 is shown. When the programming mode is entered, the docking station 150 awaits instructions. Typically, as illustrated by an arrangement 700 shown in FIG. 7, the docking station 150 is connected to a PC 702 for programming. A connection 704 may be via serial port, a USB port, or other means, such as a wireless connection. A software program resides on the PC 702 (or on a special programming device). New programs may be obtained from a source 706, such as a disk or a Web site. New programs may be downloaded via the Internet, represented by a line 708 in FIG. 7.

The memory layout schematically shown in FIG. 5 allows the entire memory of the docking station 150 to be updated or, alternatively, portions of the software stored in the memory may be selectively updated. Returning to FIG. 6, at step 602 a determination is made as to whether all of the memory is to be programmed. If it is, then processing proceeds to step 604 where the memory of FIG. 5 is erased, reprogrammed, and verified. Processing continues to step 606, where the processor 218 is reset.

If, at step 602, a determination is made that not all of the memory is to be updated, processing moves to step 608. At step 608, a determination is made as to whether a new driver is to be added. If a new driver is to be added, then the new driver is programmed at step 610 and the driver lookup table 508 and the drivers library 506 are updated and verified at step 612. Processing ends in reset oval 606.

If, at step 608, a new driver is not to be added, then processing proceeds to step 614. At step 614, a determination is made as to whether a driver is to be updated. If a driver is to be updated, then processing proceeds to step 616, where the old driver is erased from the drivers library 506 (FIG. 5). Processing continues to step 618, where the new driver is programmed and the drivers library 506 and the driver lookup table 508 are updated and verified. Processing ends in reset oval 606.

If, at step 614, a driver is not to be replaced, then processing proceeds to step 620, where a determination is made to exit program mode. If a determination is made to exit the programming mode, then the processor 218 resets at step 606. Otherwise, processing loops back to step 602.

Figure 8:
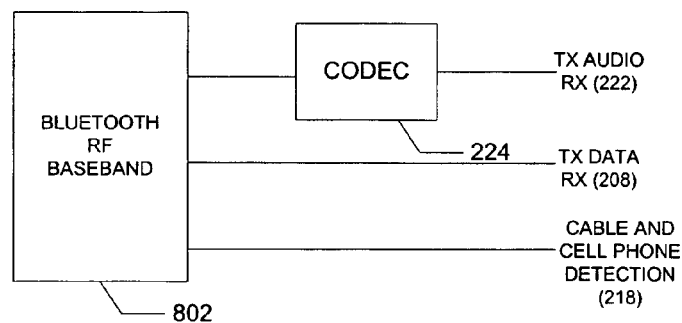
FIG. 8 schematically shows a configuration of a Bluetooth® adaptor device, according to an embodiment of the present invention.
Figure 7:
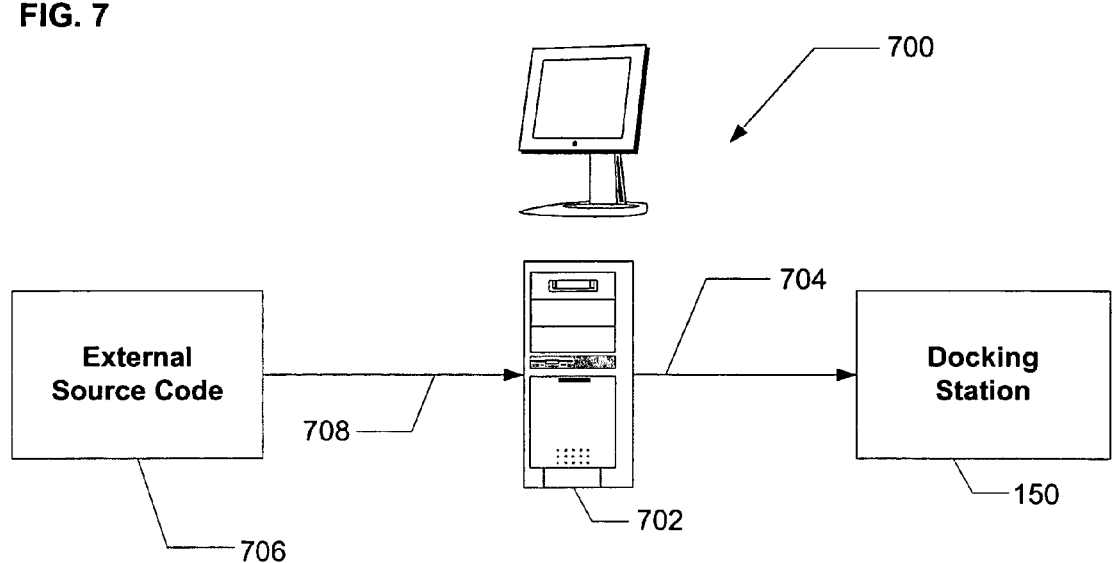
FIG. 7 schematically shows components involved in the programming of a processor of a docking station, according to an embodiment of the present invention.

Turning now to FIG. 8, a further embodiment illustrates an ability to update the docking station 150 through a Bluetooth® module 802. Essentially, the Bluetooth® module 802 wirelessly communicates with the PC 702 (FIG. 7) and acts as if it was the programming cable 704 (FIG. 7).

In general, the Bluetooth® module 802 appears as a device to the processor 208 (FIG. 2) because essentially it looks like a wireless telephone with its own set of unique family and model parameters. The Bluetooth® module 802 is connected to the codec 224 and then to the analog RX and TX gain and filtering 222. The Bluetooth® module 802 also is connected to the processor 208 for data RX and TX and to the cable and cell phone interface 218.

Figure 9:
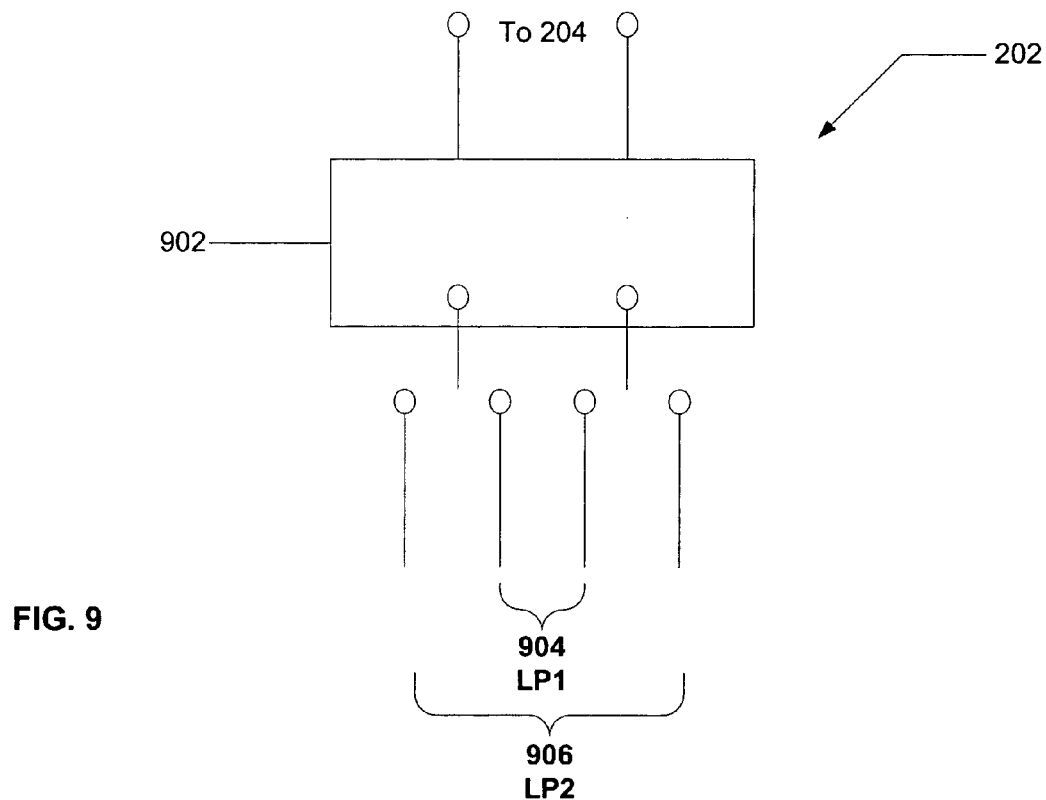
FIG. 9 schematically shows a line-pair switch.
Figure 10:
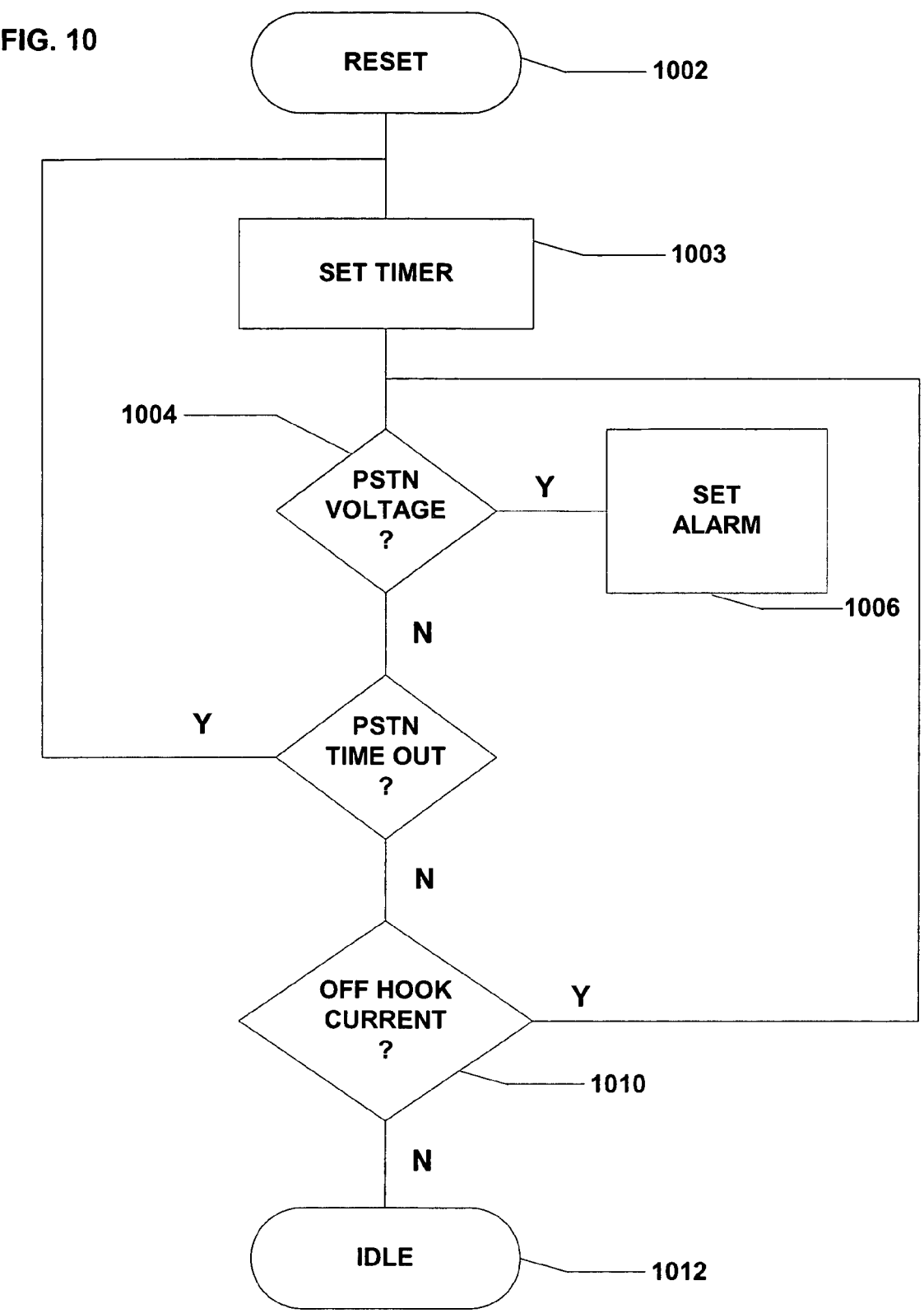
FIG. 10 is a flow chart of an operation for determining whether a telephone line is available for use by a docking station, according to an embodiment of the present invention.

Turning now to FIGS. 9 and 10, the line-pair switch 202 (FIG. 2) and an algorithm for operation thereof, respectively, are shown. There is an inherent problem with connecting the docking station 150 to existing home or landline telephone wiring. Typical landline services are not allowed to interface with new devices that supply line current. In response, the docking station 150 detects whether a line pair is already in use by a landline (that is, connected to a central office or other device supplying battery voltage). The docking station 150 senses a combination of a line voltage and current to determine (and indicate to the user) whether a line pair is already in service.

In FIG. 9, a switch 902 tests both line pairs 904 (LP1) and 906 (LP2) for presence of a landline voltage, current, or both, either manually or under software control. The switch 902 is polarity insensitive, as battery feeds can be positive or negative. Testing of the lines is according to the flow chart of FIG. 10.

Processing starts at step 1002 where a reset has occurred, whether manually, on power up, or by software control (see FIG. 6). A determination is made at step 1004 as to whether a PSTN voltage is detected. If it is, then processing proceeds to step 1006 where an alarm is set. The alarm may be a light, an audible alert, or both. If a landline is detected, the docking station 150 is disabled until the situation is corrected. Processing continues to step 1008, where a determination is made as to whether a timer has expired. If the timer has expired, processing returns to step 1003.

If, at step 1008, the timer has not expired, a determination is made at step 1010 as to whether an off-hook current is detected. If an off-hook current is detected, then processing loops back to step 1004. This test is made in case a landline is plugged in or connected to the PSTN 104 after the docking station 150 is connected to a line. If an off-hook current is not detected, then the docking station 150 is enabled for docking, and processing ends at step 1012.

Figure 11:
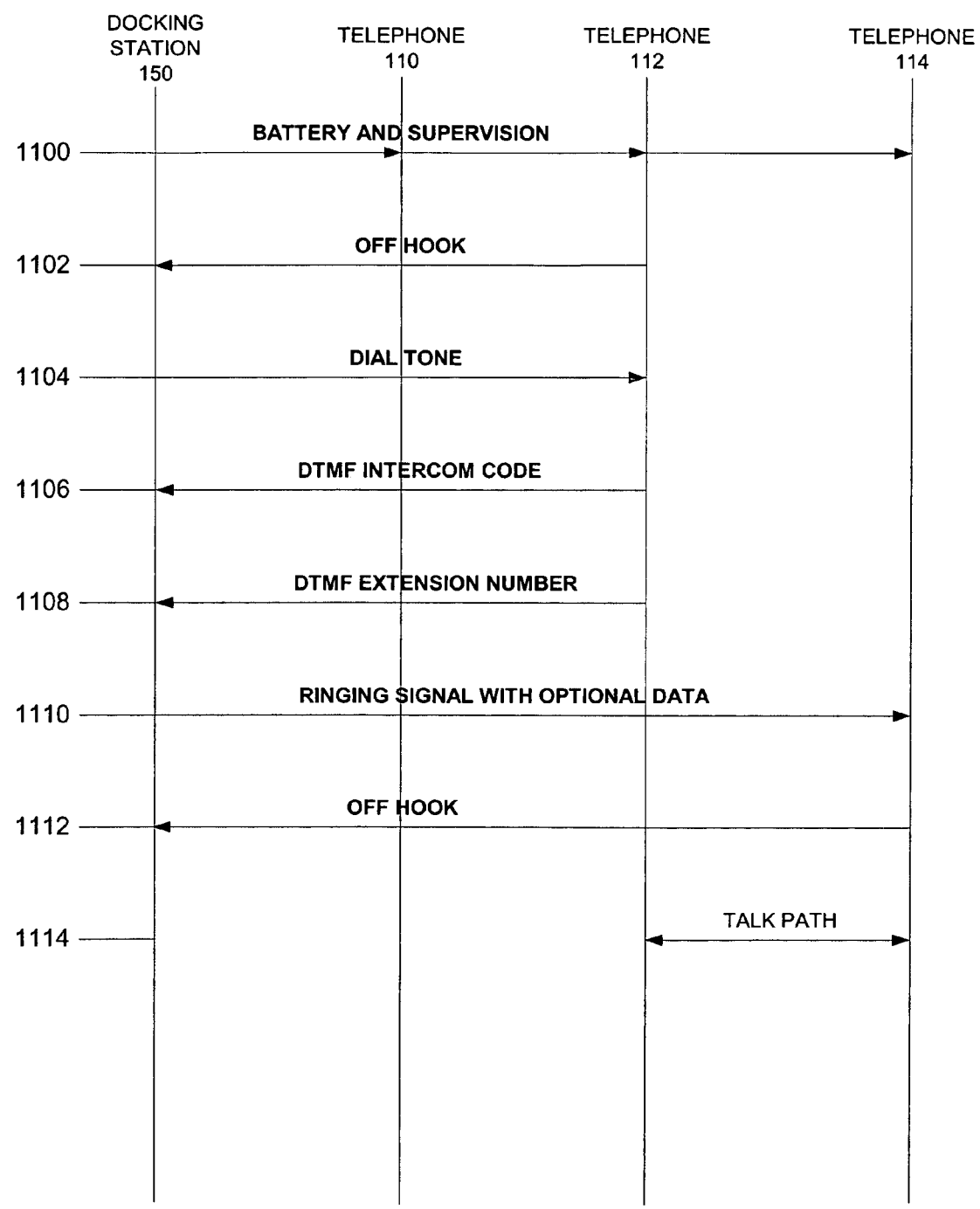
FIG. 11 is a flow chart of an operation of a docking station to provide an intercom function, according to an embodiment of the present invention.

Turning now to FIG. 11, a generic call flow is shown, which describes an aspect of the present invention, wherein the docking station 150 provides telephone-to-telephone (intercom) service. While this aspect of this invention is described in terms of a voice intercom, other uses, such as message signaling and signal lighting, will be apparent to one skilled in the art after studying this specification.

At line 1100, the docking station 150 is providing battery and line supervision to the telephones 110, 112, and 114. At line 1102, the docking station 150 detects that a telephone, the telephone 112 in this example, is off hook (i.e., current is flowing, as is known in the art). At line 1104, the docking station 150 delivers a dial tone. At line 1106, the user of the telephone 112 sends a predetermined intercom code to the docking station 150. The code may be any string of DTMF digits or symbols (i.e., "*").

Next, the docking station 150 recognizes the DTMF signal, turns off the dial tone and waits for further digits. At line 1108, the user of the telephone 112 enters an extension code for the telephone 114. At line 1110, the docking station 150 translates the extension code and sends an alerting signal. The alerting signal may simply be a ringing signal on all extensions or a differential ringing signal. If the telephone 114 is equipped with its own power supply and processor, the docking station 150 sends a predetermined signal that is recognized only by the telephone 114 as a ringing signal. Additionally, the docking station 150 may send data in the form of an FSK signal to inform the user of the telephone 114 that the call is an intercom call and, optionally, which extension the call is from. At line 1112, the docking station 150 recognizes an off-hook condition of the telephone 114 and stops the alerting signal. At step 1114, the intercom call is complete.

Figure 12:
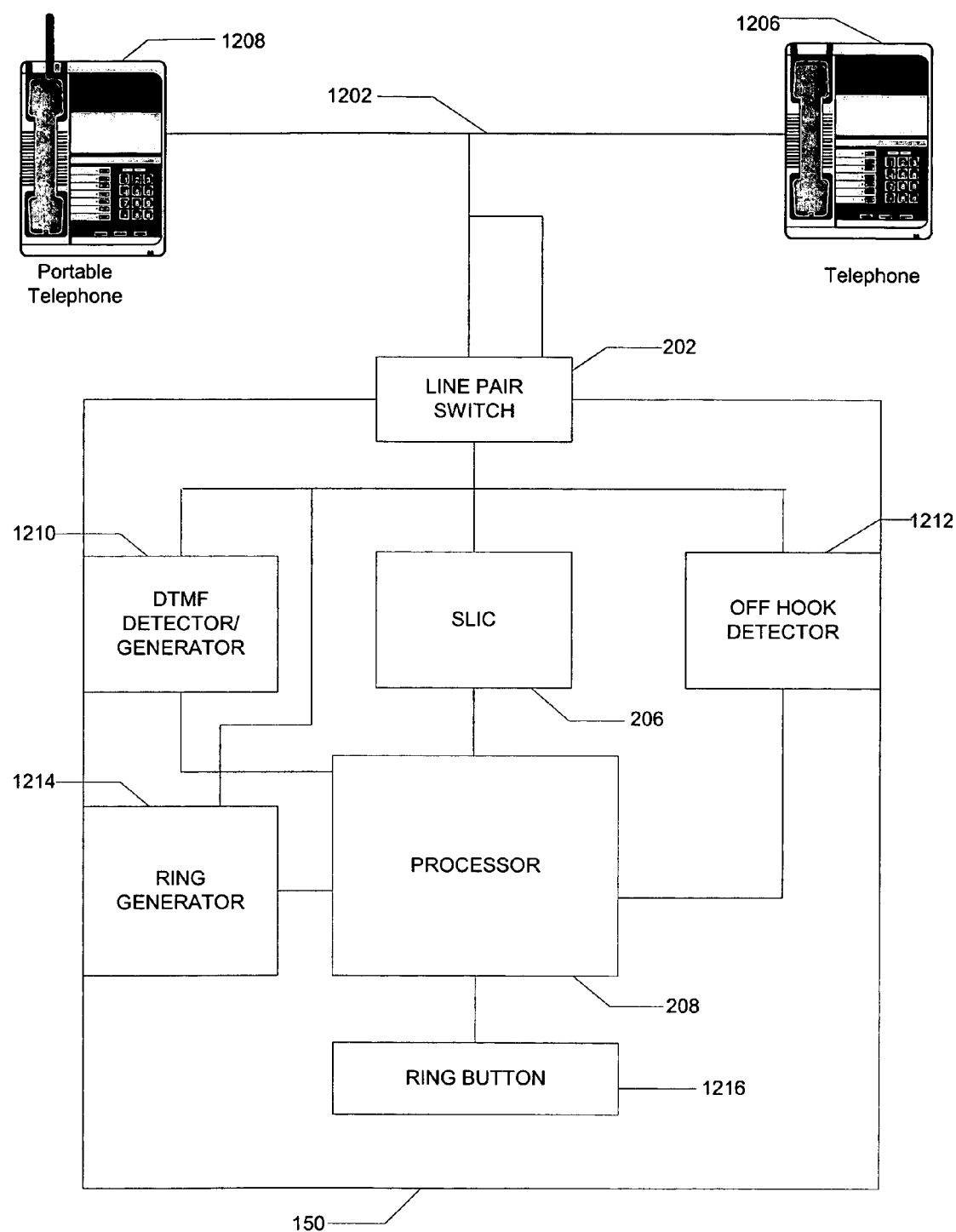
FIG. 12 is a block diagram of components involved in an intercom function of a docking station, according to an embodiment of the present invention.

Turning now to FIG. 12, operative components for providing an intercom in the docking station 150 are shown. The line-pair switch 202 is connected to premises telephone lines 1202. An analog portable telephone 1208 and an analog wireline telephone 1206 also are connected to the telephone lines 1202. The telephones 1208 and 1206 are well known in the art and therefore not discussed further.

The docking station 150 includes a DTMF detector 1210, an off-hook detector 1212 and a ring generator 1214, all of which are known in the art and therefore not discussed further. The DTMF detector 1210, the off-hook detector 1212, and the ring generator 1214 all are connected to both the line-pair switch 202 and the processor 208. A ring button 1216 also is connected to the processor 208.

When a user presses the ring button 1216, the processor 208 causes the ring generator 1214 to start a ringing sequence on all connected analog telephone sets (1208 and 1206 in the example of FIG. 12). When the ringing sequence starts, the processor 208 causes a SLIC 206 to turn off dial tone for a predetermined time (10 seconds, for example). If the off-hook detector 1212 detects an off-hook condition from any telephone on the lines 1202, it informs the processor 208. The processor 208 stops the ring generator 1214 and suppresses dial tone for the duration of the off-hook condition. An intercom telephone conversation may then be commenced.

Figure 13:
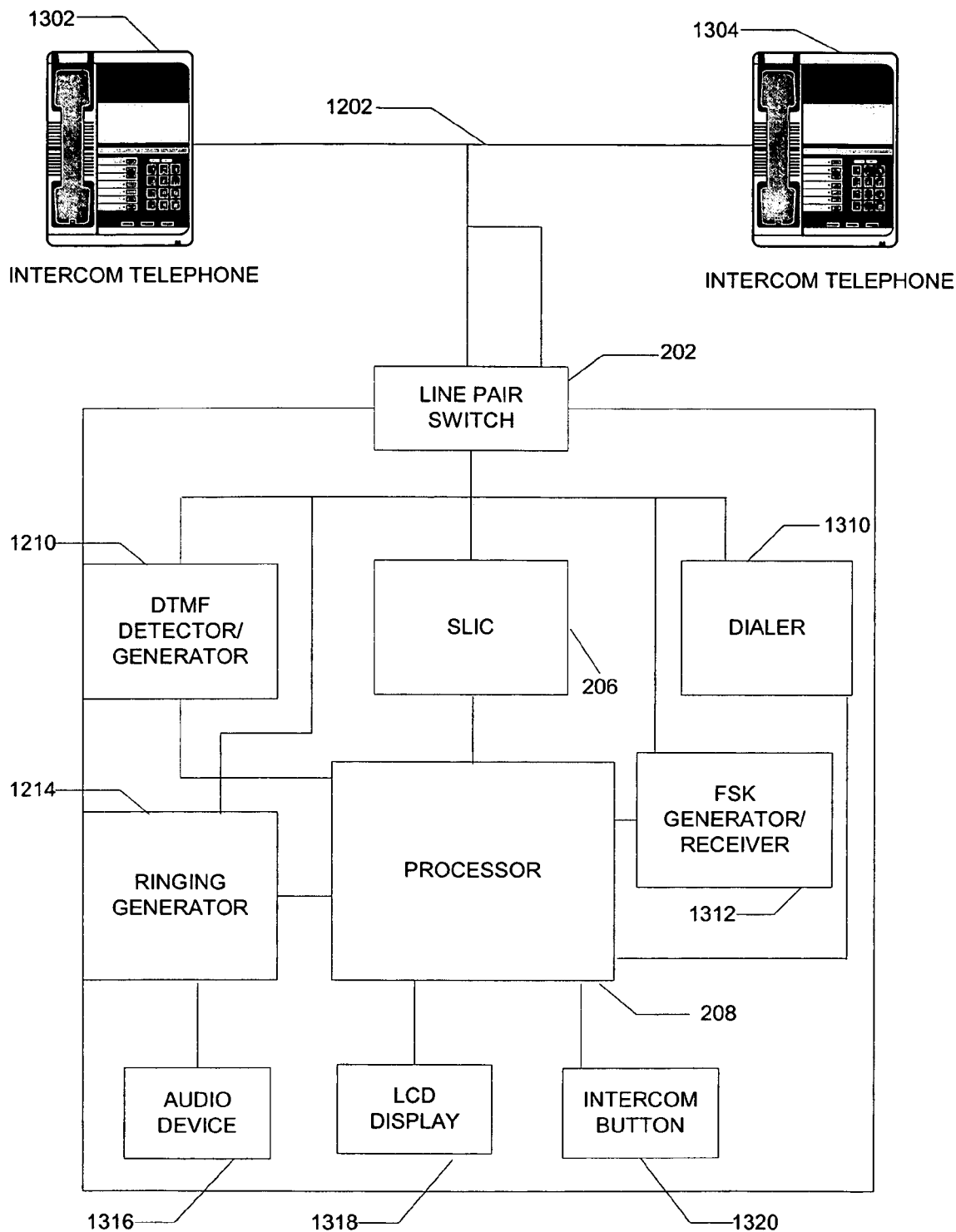
FIG. 13 is a block diagram of an intercom station, according to an embodiment of the present invention.

Turning now to FIG. 13, an exemplary embodiment of a paging/intercom station set is shown, generally at 1300, in accordance with another aspect of the present invention. The operative components of the paging/intercom station set 1300 generally comprise a line-pair switch 202, an SLIC 206, and a processor 208, all of which are described above in connection with FIG. 2. A DTMF detector 1210, a dialer circuit 1310, and an FSK generator/receiver 1312 all are connected to the line-pair switch 202 and the processor 208. Further, a ringing generator 1314 is connected to the processor 208 and to an audio device 1316 (i.e., a bell, a speaker, etc.), in order to provide an audible alerting signal. An LCD display 1318 and an intercom button 1320 also are connected to the processor 208.

In accordance with this exemplary embodiment, a user causes the paging/intercom station set 1300 to go off hook by pressing an intercom button 1320. Alternatively, the user may enter a code on a DTMF keypad (not shown, but well known in the art), such as "##." This action causes the processor 208 to turn off dial tone and digit dialing at the SLIC 206. The number of the intercom telephone (called telephone) then is entered (such as "4" for the telephone 1304). A DTMF detector 1210 in the called telephone detects the number and informs its processor 208. That processor 208 recognizes that the call is for itself and causes a ringing generator 1314 to generate a signal at an audio device 1316. When the called telephone goes off hook, the ringing signal is stopped. Further, the calling telephone can generate an FSK encoded signal at the FSK generator 1312, indicating the calling extension (or other information). An FSK receiver 1312 at the called extension decodes the FSK signal and passes any data on to its processor 208, which displays the data on a LCD display 1318.

Turning now to FIG. 14, a further exemplary embodiment of an intercom/paging telephone is illustrated, generally at 1400. As in the previous embodiments, the intercom/paging telephone 1400 is connected to intercom telephones 1302 and 1304 via telephone lines 1202. The telephone lines 1202 are connected to the intercom/paging telephone 1400 at a line-pair switch 202. The line-pair switch 202 is connected to a SLIC 206, which is connected to a processor, 208, as described above. A DTMF detector/generator 1210, an off-hook detector 1212, an FSK generator/receiver 1312, and a ringing generator 1314 all are connected to the line-pair switch 202 and are under the control of the processor 208. An audio device 1316 is connected to a ringing generator 1314. An LCD display 1318, an intercom button 1320, and a paging button 1410 are connected to the processor 208.

In the exemplary embodiment of FIG. 14, the intercom/paging telephone 1400 is programmed with an intercom number, such as "4," and also is programmed with a paging number, such as "0." The off-hook detector 1212 looks for an off-hook condition on the lines 1202. In response to detecting an off-hook condition, the off-hook detector 1212 informs the processor 208, which causes the DTMF detector/generator 1210 to listen for DTMF signals. Responsive to detecting a "4" or a "0," the processor 208 activates the ringing generator 1314, which causes the audio device 1316 to make an audible alerting signal. When the telephone 1400 goes off hook, the processor 208 causes the ringing generator 1314 to stop.

Further, the intercom/paging telephone 1400 may be equipped with direct buttons for intercom 1320, for paging 1410, or both. Activation of any of these buttons causes the processor 208 to generate an appropriate code at the DTMF detector/generator 1210.

According to another embodiment of the present invention, the user may use one of the landline telephones 110, 112, 114 to make a call by inputting a telephone number to be called and continuously holding down or manipulating a key corresponding to the last digit of the called telephone number. The processor 208 of the docking station 150 is programmed to recognize that when the last digit of a telephone number is held for a predetermined period of time (e.g., 5 seconds or between 5 to 10 seconds) inputting of the telephone number is completed. The processor 208 then functions to control the docked mobile telephone 130 to dial or call the telephone number.

According to still another embodiment of the present invention, the docking station 150 of FIG. 1 functions to enable the landline telephones 110, 112, 114 connected to the docking station 150 to send and receive "walkie-talkie" or PTT-type messages. In this embodiment, the mobile telephone 130 connected to the docking station 150 is a PTT-enabled telephone (e.g., a Nextel mobile telephone). Conventionally, users of PTT-enabled mobile telephones communicate with one another by holding down a PTT button when speaking and releasing the PTT button when listening. Landline telephones, however, do not have any hardware equivalent to a PTT button. To remedy this deficiency, the software/firmware of the processor 208 of the docking station 150 is programmed to recognize that when a predefined key or button of a landline telephone 110, 112, 114 is activated or when a hook switch (not shown) is toggled, the call is a PTT-type call.

Figure 15A:
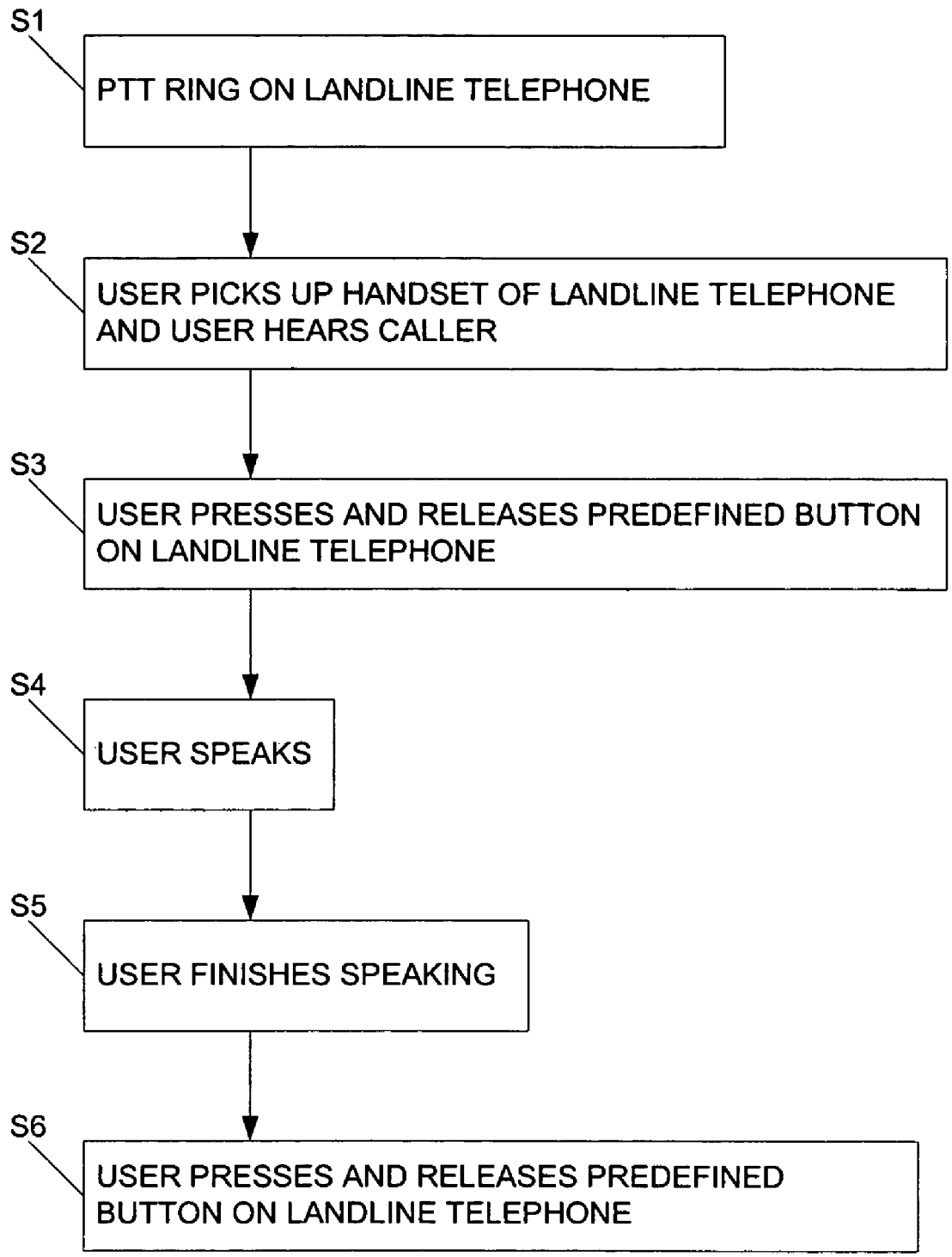
FIGS. 15A and 15B are flow charts showing operation sequences for when a landline telephone is used to send/receive calls through a PTT mobile telephone via a docking station, according to an embodiment of the present invention.
Figure 15B:
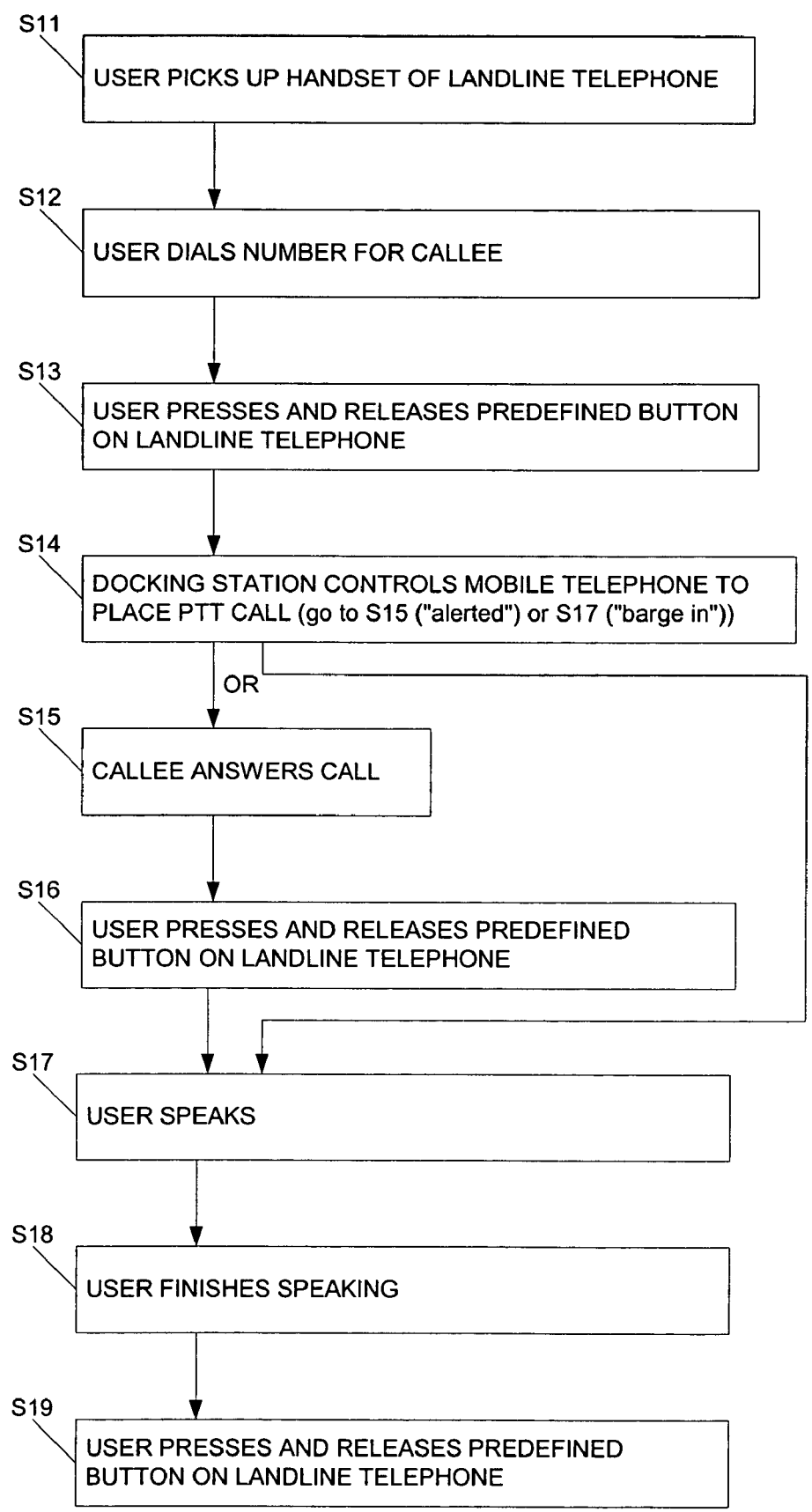

More specifically, as shown in the flow charts of FIGS. 15A and 15B, when the mobile telephone 130 docked in the docking station 150 is a PTT-enabled telephone, and when a PTT-type call is sent to the mobile telephone 130, the landline telephones 110, 112, 114 announce the call with a distinctive ring or cadence (S1). This enables a user (e.g., a callee) to know that the call is a PTT-type call and not a standard telephone call. The user may answer the call conventionally using the docked mobile telephone 130, or the user may answer the call using any of the landline telephones 110, 112, 114 connected to the docking station 150. To answer the call using one of the landline telephones 110, 112, 114, the user picks up the handset and will hear the caller speak (S2). When the user wants to speak, the user pushes and releases the predefined button of the landline telephone (S3). Optionally, instead of pushing the predefined button, the user may toggle a hook switch (not shown) of the docking station 150. At this point the user may speak to the caller (S4). When the user is finished speaking and wants to listen to the caller's response (S5), the user pushes and releases the predefined button again (S6) or toggles the hook switch again. That is, unlike conventional PTT-type calls in which the user must hold down a PTT-button in order to transmit speech, the docking station 150 allows the user merely to push and release the predefined button (or toggle the hook switch) before the user starts to speak, to enable speech transmission, and then to push and release the predefined button (or toggle the hook switch) when the user is finished speaking, to enable reception of a response. This increases the convenience and improves the ergonomics of a PTT-type call, because the user does not have to hold down a PTT-button when using one of the landline telephones 110, 112, 114 for a PTT-type call.

In order to use one of the landline telephones 110, 112, 114 to initiate a PTT-type call via the docked PTT-enabled mobile telephone 130, the user picks up the handset of one of the landline telephones 110, 112, 114 to make it go off-hook (S11). The user then dials the number for the callee (S12). Dialing may involve, for example, inputting the callee's PTT identification number, for example. To indicate that the call is a PTT-type call, the user then presses and releases the predefined button (S13) or toggles the hook switch. At that point, the docking station 150 controls the docked mobile telephone 130 to place the PTT-type call (S14). The callee is alerted about the incoming call, and the user then listens for the callee to answer. After the callee answers the call (S15), the user presses and releases the predefined button (S16) or toggles the hook switch and then commences speaking (S17). When the user is finished speaking and wants to hear a response from the callee (S18), the user presses and releases the predefined button again (S19).

Preferably, the predefined button is a Flash button, which is commonly found on standard landline telephones. The processor 208 of the docking station 150 is programmed to recognize that when the Flash button is used or when the hook switch is toggled on one of the landline telephones 110, 112, 114, a PTT-type call is taking place. The processor then functions to control the docked PTT-type mobile telephone 130 to transmit speech and receive responses in accordance with signals from the Flash button or the hook switch.

According to another embodiment of the present invention, one of the landline telephones 110, 112, 114 may be used to initiate a "barge-in" PTT-type call via the docked PTT-enabled mobile telephone 130. A barge-in PTT-type call is one in which the callee does not hear an alert about an incoming call, but instead hears the user (caller) directly. That is, the callee does not have to answer a barge-in PTT-type call, because the user's voice is heard as soon as a connection is made to the callee's telephone. To initiate a barge-in PTT-type call, the user picks up the handset of one of the landline telephones 110, 112, 114 to make it go off-hook (S11). The user then dials the number for the callee (S12). To indicate that the call is a PTT-type call, the user then presses and releases the predefined button (S13) or toggles the hook switch. At that point, the docking station 150 controls the docked mobile telephone 130 to place the PTT-type call (S14). The user can immediately start speaking (S17) and the callee will hear the message. When the user is finished speaking and wants to hear a response from the callee (S18), the user presses and releases the predefined button again (S19).

According to yet another embodiment of the present invention, the user may select whether to initiate a barge-in PTT-type call or alerted PTT-type call by activating another button in addition to the predefined button. For example, in step S12, the user may press and release the # button and then the flash button to indicate a barge-in PTT-type call. If the user presses and releases the flash button without pressing and releasing the # button first in step S12, then the user has selected to initiate an alerted PTT-type call.

According to a further embodiment of the present invention, the docking station 150 is equipped with a built-in telephone with a handset (not shown). The built-in telephone functions as one of the landline telephones 110, 112, 114 connected to the docking station 150, and thus may be used to send/receive calls via the docked PTT-type mobile telephone 130. Optionally, the built-in telephone, the handset, or both may be equipped with a PTT button that performs functions corresponding to the functions performed by a PT button on a typical PTT-type mobile telephone known in the art. For example, the PTT button of the built-in telephone or the handset may be held down by a user when speaking and released when the user is finished speaking, similar to the PTT button of a typical PTT-type mobile telephone.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A docking station for connecting a cellular telephone with one or more landline telephones, the docking station comprising:

a line-connection switch configured to detect a condition of at least one landline of a premises and to establish a connection with a landline based on a detected condition, wherein each of the one or more landline telephones is connected to the docking station through the landline;

a processor configured to control a plurality of functions of the docking station; and a cellular-telephone interface configured to connect with any of a plurality of types of cellular telephones, wherein the cellular-telephone interface includes a connector configured to connect with a plurality of types of cables through which the docking station communicates with corresponding cellular telephones, wherein an electrical characteristic of a cable connected to the cellular-telephone interface is used by the processor to identify a type of a cellular telephone connected to the docking station, wherein the processor is programmed to communicate with a plurality of types of cellular telephones, and wherein the processor is programmed to enable a landline telephone connected to the docking station to send or to receive calls via the cellular telephone connected to the docking station, based on an identified type of the cellular telephone connected to the docking station, by:
translating signals transmitted from the landline telephone to the cellular telephone into signals recognizable by the cellular telephone, and
translating signals from the cellular telephone to the landline telephone into signals recognizable by the landline telephone.

2. A docking station according to claim 1, wherein the connector of the cellular-telephone interface is a multi-pin connector.

3. A docking station according to claim 1, wherein the processor is programmed to communicate with a plurality of types of cellular telephones from a plurality of different manufacturers.

4. A docking station according to claim 1, wherein the identified type of the cellular telephone is an identification of at least one of a manufacturer of the cellular telephone and a model of the cellular telephone.

5. A docking station according to claim 1, wherein the connector of the cellular-telephone interface is configured to connect with one or more types of wireless modules through which the docking station communicates wirelessly with corresponding cellular telephones.

6. A docking station according to claim 5, wherein the one or more types of wireless modules that may connect with the connector of the cellular-telephone interface includes at least one of a Bluetooth® module, a wi-fi module, and a Zigbee™ module.

7. A docking station according to claim 1, further comprising a wireless-communication circuit configured to enable the processor to communicate wirelessly with a cellular telephone.

8. A docking station according to claim 7, wherein the wireless communication circuit enables communication according to one or more of one or more of a Bluetooth® standard, a wi-fi standard, and a Zigbee™ standard.

9. A docking station according to claim 1, further comprising a charger configured to charge a battery of the cellular telephone,
wherein the cellular telephone is connected to the docking station via a cable, and
wherein the processor is programmed to control the charger according to the identified type of the cellular telephone, such that the charger charges the battery of the cellular telephone at a voltage and a current appropriate for the identified type of the cellular telephone.

10. A docking station according to claim 9, wherein the charger selectively provides a charge, ranging from a full charge to a trickle charge, to the battery of the cellular telephone.

11. A docking station according to claim 9, further comprising a display device configured to display a charging status of the battery of a cellular telephone.

12. A docking station according to claim 1, wherein the condition detected by the line-connection switch is a voltage condition, and the line-connection switch establishes a connection with a landline for which no voltage is measured.

13. A docking station according to claim 12, wherein the line-connection switch automatically establishes a connection with a landline for which no voltage is measured.

14. A docking station according to claim 1, wherein the line-connection switch detects a plurality of conditions and provides a visible indication, an audible indication, or both a visible and an audible indication of each detected condition.

15. A docking station according to claim 14, wherein the line-connection switch allows a user to manually select a landline to be connected with the docking station.

16. A docking station according to claim 14, further comprising a display device configured to display at least the visible indication provided by the line-connection switch.

17. A docking station according to claim 16, wherein the display device is an LED device configured to display a color condition when there is no measurable voltage on a landline being tested.

18. A docking station according to claim 16, wherein the display device is an LED device configured to display a color condition when a voltage is measured on a landline being tested.

19. A docking station according to claim 16, wherein the display device is configured to display a visual indication when a cellular telephone connected to the cellular-telephone interface is recognized by the processor.

20. A docking station according to claim 16, wherein the display device is an LED device configured to display a plurality of color conditions for respectively indicating one or more of:
when a voltage is measured on a landline being tested,
when there is no measurable voltage on a landline being tested,
when a cellular telephone connected to the cellular-telephone interface is recognized by the processor, and,
a charge status of a battery of a cellular telephone connected to the cellular-telephone interface and recognized by the processor.

21. A docking station according to claim 20, wherein the plurality of color conditions includes a solid-off condition, a flashing on/off condition, and a solid-on condition.

22. A docking station according to claim 20, wherein the LED device displays at least two colors, and wherein the plurality of color conditions includes at least: a solid-off condition of a first color; a solid-off condition of a second color; a flashing on/off condition of the first color; a flashing on/off condition of the second color; a solid-on condition of the first color; and a solid-on condition of the second color.

23. A docking station according to 14, further comprising a sound device configured to emit a sound corresponding to the audible indication provided by the line-connection switch.

24. A docking station according to claim 23,
wherein the sound device is configured to emit a plurality of sounds for respectively indicating at least:
when a voltage is measured on a landline being tested,
when there is no measurable voltage on a landline being tested, and
when a cellular telephone connected to the cellular-telephone interface is recognized by the processor, and wherein the plurality of sounds includes any or all of a solid tone, silence, an on/off sequence of a tone, and a sequence of tones.

25. A docking station according to claim 1,
wherein the processor is a programmable microprocessor, and
wherein the cellular-telephone interface is configured to connect with a programming cable through which the microprocessor receives programming instructions.

26. A docking station according to claim 25, further comprising a memory configured with storage areas for storing information that includes one or more of a manufacturer code look-up table, a model look-up table, a drivers library, and a driver look-up table,
wherein the programming cable connects the docking station with an external programming unit, and
wherein the external programming unit selectively adds data to, deletes data from, or updates data stored in one or more of the storage areas.

27. A docking station according to claim 26, wherein the external programming unit is an external computer.

28. A docking station according to claim 27, wherein the external computer selectively modifies the information stored in the storage areas based on information obtained from a Web site.

29. A docking station according to claim 1, further comprising an echo canceller configured to compensate an impedance imbalance that may occur when the one or more landline telephones connected to the docking station are in an off-hook condition.

30. A docking station according to claim 29, wherein the echo canceller performs one or more functions including:
controlling audio gain;
tracking an echo-environment change;
controlling an echo-return loss;
controlling a convergence characteristic;
enabling full-duplex speech;
providing automatic gain control;
providing an offset null;
providing howling prevention; and
providing mute options.

31. A docking station according to claim 1, further comprising an digital/analog interface circuit configured to receive digital data from a cellular telephone connected to the docking station via the cellular-telephone interface and to provide data-encoded signals to one or more of the landline telephones, wherein the digital/analog interface converts a digital signal into one or more of a frequency-shift-key (FSK) signal, a DTMF signal, and a ring cadence.

32. A docking station according to claim 1, further comprising an digital/analog interface circuit configured to receive digital data from a cellular telephone connected to the docking station via the cellular-telephone interface and to provide data-encoded signals to one or more of the landline telephones, wherein the digital/analog interface performs functions including at least one of:
conversion of a digital Caller ID signal to an analog display signal that may be used to display a message on the one or more landline telephones; and
conversion of a digital short-message-service (SMS) signal to an analog display signal that may be used to display a message on the one or more landline telephones.

33. A docking station according to claim 1, further comprising a digital/analog interface circuit configured to send/receive digital data to/from a cellular telephone connected to one or more of the landline telephones via the docking station.

34. A docking station according to claim 1, wherein the processor is programmed to recognize that when a key, corresponding to a last digit of a telephone number inputted at a landline telephone connected to the docking station, is continuously manipulated or pressed for at least a predetermined period of time:
the telephone number has been completely inputted, and
a cellular telephone connected to the docking station is to begin calling the telephone number.

35. A docking station for connecting a cellular telephone with one or more landline telephones, the docking station comprising:
a line-connection switch configured to detect a condition of at least one landline of a premises and to establish a connection with a landline based on a detected condition, wherein each of the one or more landline telephones is connected to the docking station through the landline;
a processor configured to control a plurality of functions of the docking station; and
a cellular-telephone interface configured to communicate wirelessly with a cellular telephone,
wherein the processor is programmed to enable a landline telephone connected to the docking station to send or to receive calls via the cellular telephone, which communicates wirelessly with the docking station, by:
translating signals transmitted from the landline telephone to the cellular telephone into signals recognizable by the cellular telephone, and
translating signals from the cellular telephone to the landline telephone into signals recognizable by the landline telephone.

36. A docking station according to claim 35, wherein the cellular-telephone interface includes a connector configured to connect with one or more types of external wireless modules through which the docking station communicates wireless with corresponding cellular telephones.

37. A docking station according to claim 35, wherein the cellular-telephone interface includes a communication circuit configured to enable the processor to communicate wirelessly with the cellular telephone.

38. A docking station according to claim 35, wherein the processor is programmed to recognize that when a key, corresponding to a last digit of a telephone number inputted at a landline telephone connected to the docking station, is continuously manipulated or pressed for at least a predetermined period of time:
the telephone number has been completely inputted, and
a cellular telephone in communication with the docking station is to begin calling the telephone number.

* * * * *